US012042950B2

(12) United States Patent
Jone et al.

(10) Patent No.: US 12,042,950 B2
(45) Date of Patent: Jul. 23, 2024

(54) SYSTEMS AND METHODS OF CHAINSAW TENSIONING

(71) Applicant: Techtronic Cordless GP, Anderson, SC (US)

(72) Inventors: Calvin Jone, Anderson, SC (US); Martin Lai, Anderson, SC (US); Chris Song, Roswell, GA (US); Andrew Ramsager, Atlanta, GA (US); John Huang, Atlanta, GA (US); Anderson Duong, Frederick, MD (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

(21) Appl. No.: 18/134,232

(22) Filed: Apr. 13, 2023

(65) Prior Publication Data

US 2023/0241797 A1 Aug. 3, 2023

Related U.S. Application Data

(63) Continuation of application No. 17/523,873, filed on Nov. 10, 2021, now Pat. No. 11,673,287.

(51) Int. Cl.
*B27B 17/14* (2006.01)
*B27B 17/02* (2006.01)
*B27B 17/08* (2006.01)

(52) U.S. Cl.
CPC .............. *B27B 17/14* (2013.01); *B27B 17/02* (2013.01); *B27B 17/08* (2013.01)

(58) Field of Classification Search
CPC ......... B27B 17/02; B27B 17/14; B27B 17/08; B23D 45/00
See application file for complete search history.

(56) References Cited

U.S. PATENT DOCUMENTS 6,944,957 B2 * 9/2005 Donnerdal .............. B27B 17/14 30/386
2005/0044727 A1 3/2005 Donnerdal et al.
2006/0207111 A1 9/2006 Sugishita
2019/0366580 A1 12/2019 Lu
2021/0339421 A1 11/2021 Lu

FOREIGN PATENT DOCUMENTS

CN 101863055 A 10/2010
CN 201702820 U 1/2011
CN 204755795 U 11/2015

(Continued)

*Primary Examiner* — Jennifer S Matthews
(74) *Attorney, Agent, or Firm* — Dority & Manning, P.A.

(57) ABSTRACT

A chainsaw including a body including a bar stud extending therefrom; a guide bar including a bar stud slot that receives the bar stud, wherein the bar stud slot has a length, and wherein the guide bar is configured to receive a chain; a yoke having a groove defining a length extending in a direction angularly offset from the length of the bar stud slot of the guide bar, wherein the yoke is coupled to the guide bar; a ratchet gear including a one-way motion feature and a post extending into the groove of the yoke, wherein rotating the ratchet gear in a first direction moves the guide bar to tighten the chain, and wherein rotating the ratchet gear in a second direction moves the guide bar to loosen the chain; and a pawl selectively engaged with the one-way motion feature of the ratchet gear.

20 Claims, 5 Drawing Sheets

(56) References Cited

FOREIGN PATENT DOCUMENTS

| | | | | | |
|---|---|---|---|---|---|
| CN | 105134894 | A | | 12/2015 | |
| CN | 113246228 | A | * | 8/2021 | ............. B27B 17/02 |
| EP | 2686147 | B1 | * | 4/2016 | ............. B27B 17/14 |
| EP | 3808520 | A2 | * | 4/2021 | ............. B27B 17/02 |
| GB | 578825 | A | | 7/1946 | |
| GB | 2452768 | A | * | 3/2009 | ............. B27B 17/14 |
| JP | 3085277 | U | * | 4/2002 | |
| WO | WO-2010134391 | A1 | * | 11/2010 | ............. B27B 17/14 |
| WO | WO2012041192 | A1 | | 4/2012 | |
| WO | WO-2013136724 | A1 | * | 9/2013 | ............. B27B 17/02 |
| WO | WO-2016045773 | A1 | * | 3/2016 | ............. B27B 17/02 |

* cited by examiner

SYSTEMS AND METHODS OF CHAINSAW TENSIONING

PRIORITY CLAIM

This application is a continuation of U.S. patent application Ser. No. 17/523,873 filed on Nov. 10, 2021, the disclosure of which is incorporated by reference herein in its entirety.

FIELD

The present disclosure relates generally to chain saws, and more particularly to systems and methods of tensioning chainsaws.

BACKGROUND

Chainsaws typically include a guide bar that utilizes a chain provided therearound and which moves relative to the guide bar. Chains typically utilize a plurality of segments each having a cutting surface. As the chain is driven around the chain bar, the cutting surfaces of the chain segments cut into the surface being operated on.

Over time, connection interfaces between adjacent segments of the chain can become elongated and worn. This is typically the result of fatigue which occurs as the chain is repeatedly driven around the guide bar under load. As these connection interfaces elongate, chain tension decreases. That is, the chain becomes less taught, and slack is introduced into the system. As slack increases, the chain may become less stable on the guide bar. In some instances, too much slack can result in the chain jumping off the guide bar. This introduces unreasonable danger to the operator and can damage the chainsaw.

Accordingly, improved chainsaw tensioning systems and methods are desired in the art. In particular, chainsaws which allow for simple and effective chainsaw tensioning would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a chainsaw is provided. The chainsaw includes a body including a bar stud extending therefrom; a guide bar including a bar stud slot that receives the bar stud, wherein the bar stud slot has a length, and wherein the guide bar is configured to receive a chain; a yoke having a groove defining a length extending in a direction angularly offset from the length of the bar stud slot of the guide bar, wherein the yoke is coupled to the guide bar; a ratchet gear including a one-way motion feature and a post extending into the groove of the yoke, wherein rotating the ratchet gear in a first direction moves the guide bar to tighten the chain, and wherein rotating the ratchet gear in a second direction moves the guide bar to loosen the chain; and a pawl selectively engaged with the one-way motion feature of the ratchet gear, wherein the pawl permits rotation of the ratchet gear in the first direction, and wherein the pawl permits rotation of the ratchet gear in the second direction only when the pawl is selectively disengaged from the ratchet gear.

In accordance with another embodiment, a chainsaw tensioning system is provided. The chainsaw tensioning system includes a yoke comprising a body defining a yoke slot and a groove angularly offset from the yoke slot; a ratchet gear comprising a one-way motion feature, a post extending into the groove of the yoke, and teeth, wherein the teeth are disposed on a first side of the ratchet gear, wherein the post is disposed on a second side of the ratchet gear, and wherein the one-way motion feature is disposed along a radial edge of the ratchet gear; a pawl selectively engaged with the one-way motion feature of the ratchet gear, the pawl configured to permit rotation of the ratchet gear in a first direction and selectively prevent rotation of the ratchet gear in a second direction; a tensioning knob comprising a grip portion and teeth configured to transmit rotational movement to the teeth of the ratchet gear; and a tightening cap configured to selectively tighten the chainsaw tensioning system to a bar stud of a chainsaw.

In accordance with another embodiment, a method of tensioning a chainsaw is provided. The method includes loosening a tightening cap of a tensioning system of the chainsaw; after loosening the tightening cap, rotating a tensioning knob in a first direction such that a ratchet gear operably coupled to the tensioning knob rotates in the first direction, the ratchet gear comprising a post; and the post of the ratchet gear moving within a groove of a yoke of the tensioning system and causing the yoke to translate in a direction generally perpendicular to a length of the groove, the yoke being coupled with the guide bar.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1:
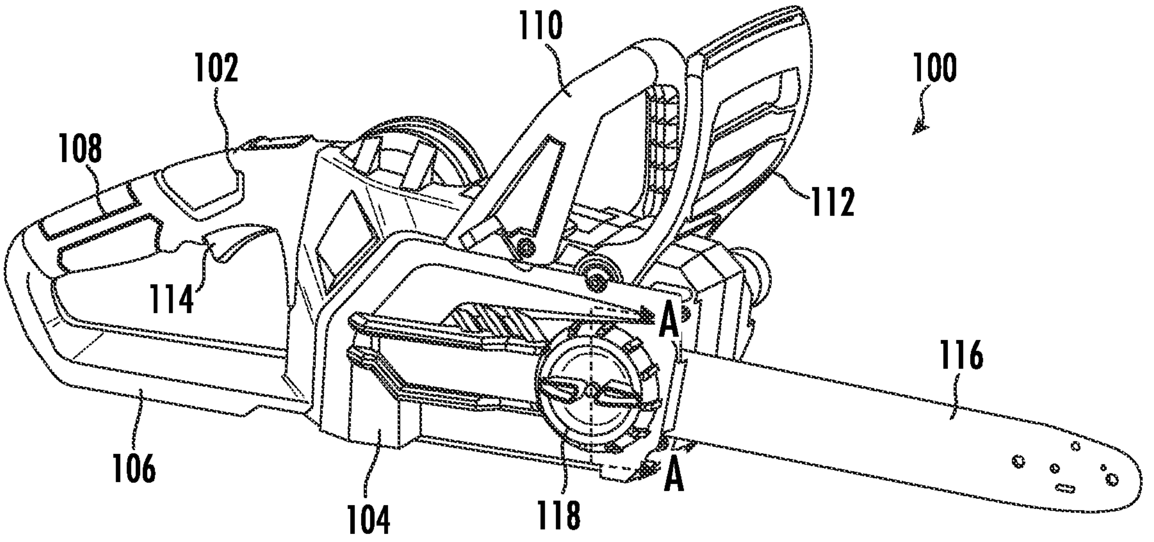
FIG. 1 is a perspective view of a chainsaw in accordance with an exemplary embodiment of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive—or and not to an exclusive—or. For example, a condition A or Bis satisfied by any one of the following: A is true (or present) and B is false (or not present), A is false (or not present) and B is true (or present); and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, chainsaws in accordance with embodiments described herein can utilize chain tensioning systems which are adjustable without the use of tools. In certain instances, tensioning systems described in accordance with one or more embodiments may allow an operator to utilize rotational movement of a tensioning knob to affect linear movement of a guide bar of the chain saw. The tensioning knob may be in operable communication with a ratchet gear which includes a post extending into a groove of a yoke. The yoke can be coupled with the guide bar holding the chain. As the tensioning knob is rotated, the post can bias the yoke towards or away from a body of the chainsaw.

Referring initially to FIG. 1, a chainsaw 100 in accordance with one or more embodiments described herein can generally include a body 102 including a housing 104, one or more handles 106 (such as a rear handle 108 and a front handle 110), a guard 112 which can also act as a braking mechanism, a trigger 114, and a guide bar 116. The guide bar 116 can extend from the housing 104 and project a distance therefrom. The guide bar 116 can include a track (not illustrated) which extends around a perimeter of the guide bar 116. A chain (not illustrated) can be guided along the track so as to travel around the guide bar 116. The chain can include a plurality of connective segments each having at least one cutting surface. The chain can be driven by a drive gear coupled to a motor of the chainsaw 100. As the chain is used in cutting operations, it is not uncommon for interfaces between adjacent connective segments to lengthen. As these interfaces lengthen, an effective length of the chain increases.

The chainsaw 100 can further include a tensioning system 118 configured to adjust the location of the guide bar 116 relative to the body 102 to accommodate lengthening of the chain. As the guide bar 116 is moved away from the body 102, the chain tension tightens. Conversely, as the guide bar 116 moves towards the body 102, the chain tension decreases. In accordance with one or more embodiments of the present disclosure, the tensioning system 118 allows the operator to take up the slack in the chain which occurs as the chain lengthens.

Figure 2:
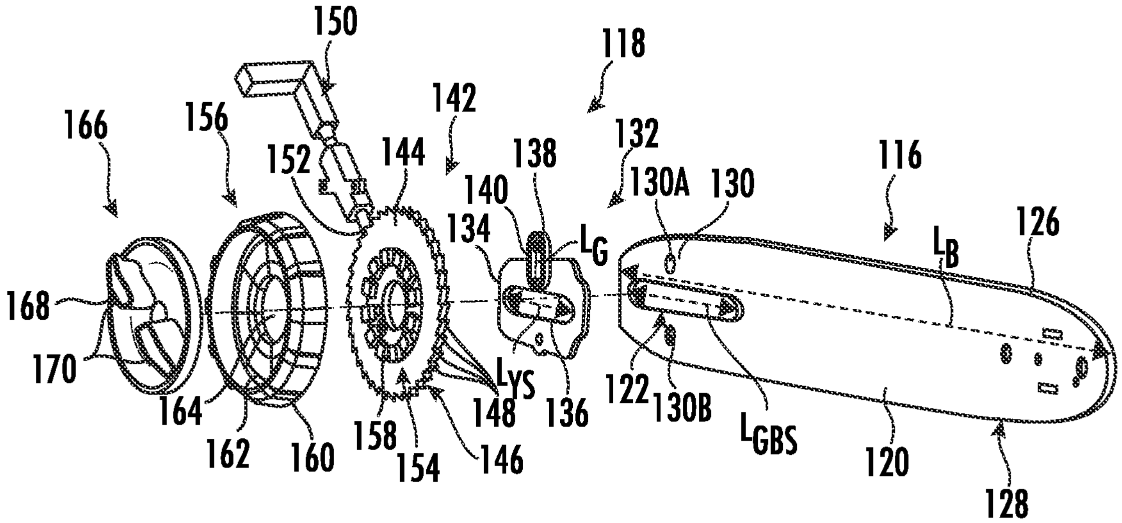
FIG. 2 is an exploded view of a tensioning system of the chainsaw in accordance with an exemplary embodiment of the present disclosure.

Referring to FIG. 2, the guide bar 116 generally includes a body 120 defining a guide bar slot 122. In accordance with one or more embodiments, the body 120 has a length LB, that is parallel, or generally parallel, with a length, $L_{GBS}$, of the guide bar slot 122. A bar stud 124 (FIG. 3) can be fixed to the body 102 and extend through the guide bar slot 122 such that the guide bar 116 can move relative to the bar stud 124 in a direction generally parallel with the length, $L_{GBS}$, of the guide bar slot 122. The bar stud 124 can have a maximum effective dimension, such as a diameter, DBs, as measured at the guide bar slot 122, that is less than 99% of the length $L_{GBS}$ of the guide bar slot 122, such as less than 90% $L_{GBS}$, such as less than 75% $L_{GBS}$, such as less than 50% $L_{GBS}$, such as less than 25% $L_{GBS}$, such as less than 10% $L_{GBS}$, such as less than 5% LGBs. The ratio of $D_{BS}$ to $L_{GBS}$ [$D_{BS}$:$L_{GBS}$] can determine a maximum tensioning distance, i.e., a maximum displacement distance of the guide bar 116 between a fully detensioned state and a fully tensioned state.

As previously described, the guide bar 116 can include a track 126. The track 126 may extend around a perimeter of the body 120 of the guide bar 116. In certain instances, the track 126 may include a recessed portion which extends into a radial edge 128 of the body 120. In some embodiments, the guide bar 116 can include two or more pieces, such as two halves which join together to form the track 126 at a seam therebetween. Other track 126 configurations and layouts are possible without departing from the scope of this disclosure.

In accordance with an embodiment, the guide bar 116 can include a connection interface 130 to mate the guide bar 116 with a yoke 132. In a particular embodiment, the connection interface 130 may include a first connection interface 130A disposed on a first side of the guide bar slot 122 and a second connection interface 130B disposed on a second side of the guide bar slot 122. The connection interface(s) 130 can include any one or more of recesses, projections, or the like which are configured to pair with corresponding features of the yoke 132.

In an embodiment, the yoke 132 can include a discrete body 134 separate from the guide bar 116. In another embodiment, the yoke 132 can be part of the guide bar 116. For instance, as described above, the guide bar 116 can include two halves. The yoke 132 may be integral with one or both of the two halves of the guide bar 116.

In the assembled state, the yoke 132 may be disposed adjacent to the guide bar 116. In a particular embodiment, the yoke 132, or a portion thereof, may be disposed immediately adjacent to the guide bar 116 such that the yoke contacts the guide bar 116. In another particular embodiment, the yoke 132, or a portion thereof, may be spaced apart from the guide bar 116, e.g., by an intermediate member.

The yoke 132 can include a yoke slot 136. The yoke slot 136 can have a length, Lys. The length Lys of the yoke slot 136 can be parallel, or generally parallel, with the length $L_{GBS}$ of the guide bar slot 122. In certain instances, the yoke slot 136 can have a same, or generally same, aerial size or shape as compared to the guide bar slot 122. In certain instances, the boundaries of the yoke slot 136 and guide bar slot 122 may align, or generally align, when the yoke 132 is mated with the guide bar 116.

The yoke 132 can further include a groove 138. In the illustrated embodiment, the groove 138 extends into the body 134 of the yoke 132 but does not fully penetrate the body 134. In a non-illustrated embodiment, the groove 138 may penetrate the body 134 such that the groove 138 passes through the yoke 132.

The groove 138 has a length, LG, that is angularly offset from the length Lys of the yoke slot 136. In an embodiment, the length LG of the groove 138 is angularly offset from the length Lys of the yoke slot 136 by at least 5 degrees, such as at least 10 degrees, such as at least 30 degrees, such as at least 45 degrees, such as at least 60 degrees, such as at least 80 degrees. In a particular embodiment, the length LG of the groove 138 can be perpendicular, or generally perpendicular, with the length Lys of the yoke slot 136.

The groove 138 can have a generally linear profile. By way of a particular embodiment, the groove 138 can have a centerline, as measured between longitudinal ends of the groove 138, that lies along a straight line.

The groove 138 can define a sidewall 140. With the yoke 132 mated with the guide bar 116, the groove 138 (and more particularly the sidewall 140 of the groove 138) can create a surface against which pressure can be applied to move the guide bar 116 during tensioning operations.

In an embodiment, the yoke 132 can be disposed between the guide bar 116 and a ratchet gear 142. As described in greater detail below, the ratchet gear 142 can interface with the yoke 132, and more particularly the groove 138, to drive the yoke 132 for tensioning the guide bar 116.

The ratchet gear 142 can generally include a body 144 defining a one-way motion feature 146 configured to permit rotation of the ratchet gear 142 in a first direction to allow tensioning of the guide bar 116 and prevent rotation of the ratchet gear 142 in a second direction (opposite the first direction) to detension the guide bar 116. In an embodiment, the one-way motion feature 146 can be disposed at a radial edge of the ratchet gear 142. In the illustrated embodiment, the one-way motion feature 146 is a serrated edge including a plurality of ridges 148. In certain instances, the adjacent ridges 148 can be spaced apart by the same distances as compared to one another, as measured around a circumference of the body 144. In other instances, the adjacent ridges 148 can be spaced apart at variable distances, as measured around the circumference of the body 144.

A pawl 150 can include an interface 152 configured to engage with the one-way motion feature 146, e.g., at the ridges 148, to prevent undesirable rotation of the ratchet gear 142 in the second direction. In one or more embodiments, the pawl 150 can be biased towards the ratchet gear 142. For example, the pawl 150 may be spring biased towards the ratchet gear 142 by a spring (not illustrated), e.g., a helical spring. In such a manner, the interface 152 of the pawl 150 can interface with the ridges 148 of the ratchet gear 142 under load.

causing the yoke to translate in the first direction advances the pawl from a first stop location along the one-way motion feature to a second stop location along the one-way motion feature In certain instances, the ridges 148 can be shaped to permit the interface 152 to slide relative to the one-way motion feature 146 when the ratchet gear 142 is rotated in the first direction while the pawl 150 is under spring bias. For instance, causing the yoke 132 to translate in the first direction by rotating the ratchet gear 142 can cause the pawl to advance from a first stop location along the ridges 148 to a second stop location along the ridges 148.

To the contrary, the ridges 148 can be shaped to prevent the interface 152 from sliding relative to the one-way motion feature 146 when the ratchet gear 142 is rotated in the second direction while the pawl 150 is under spring bias. For rotation of the ratchet gear 142 in the second direction, the pawl 150 can be released by, e.g., acting on the pawl 150 in a direction opposite the direction of the spring-biased force. Upon acting on the pawl 150, i.e, pulling the pawl 150 away from the ratchet gear 142, the ratchet gear 142 may rotate in the second direction thereby releasing tension on the guide bar 116.

The ratchet gear 142 can further include an interface 154 configured to couple the ratchet gear 142 relative to a tensioning knob 156. The interface 154 can be a synchro-engagement configured to engage with the tensioning knob 156. The interface 154 can include, for example, a plurality of teeth 158 (such as dogs) that are sized, shaped, and positioned to interface with corresponding features (e.g., teeth) on the tensioning knob 156.

The tensioning knob 156 can be configured to receive user input as part of tensioning operations. That is, the tensioning knob 156 can form at least part of a user interface to allow a user to adjust tension of the guide bar 116. In this regard, the tensioning knob 156 can include surface features, such as knurling, ridges, or the like to facilitate ease of grasping. When rotated, the tensioning knob 156 can transmit rotation to the ratchet get 142 which can, in turn, move the yoke 132 relative to the bar stud 124.

In an embodiment, the tensioning knob 156 can include a body 160 defining a central recess 162. A pass-through hole 164 in the body 160 can permit the bar stud 124 to extend through the tensioning knob 156. In an embodiment, the pass-through hole 164 can be centrally disposed relative to the central recess 162.

A tightening cap 166 can be disposed at least partially within the central recess 162. The tightening cap 166 can be configured to interface with the bar stud 124 (or another element of the chainsaw 100) to tighten and lock the tensioning system 118, effectively locking the guide bar at a fixed location to lock chain tension after completion of a tensioning operation.

In the illustrated embodiment, the tightening cap 166 includes a body 168 sized and shaped to fit at least partially within the central recess 162. The body 168 may include user engageable features, such as wings 170, that allow the user to introduce force thereagainst. By way of example, when the user rotates the tightening cap 166, e.g., using the wings 170, in a first direction the tightening cap 166 can move towards the guide bar 116 so as to compress the guide bar 116 so that the tensioning system 118 cannot move. Conversely, when the user rotates the tightening cap 166 in a second direction, the tightening cap 166 can move away from the guide bar 116 so as to loosen the tensioning system 118. In certain instances, the tightening cap 166 may include threads (not illustrated) which interface with complementary threads on the bar stud 124. In this regard, rotating the tightening cap 166 can affect the position of the tightening cap 166 relative to the bar stud 124.

Figure 3:
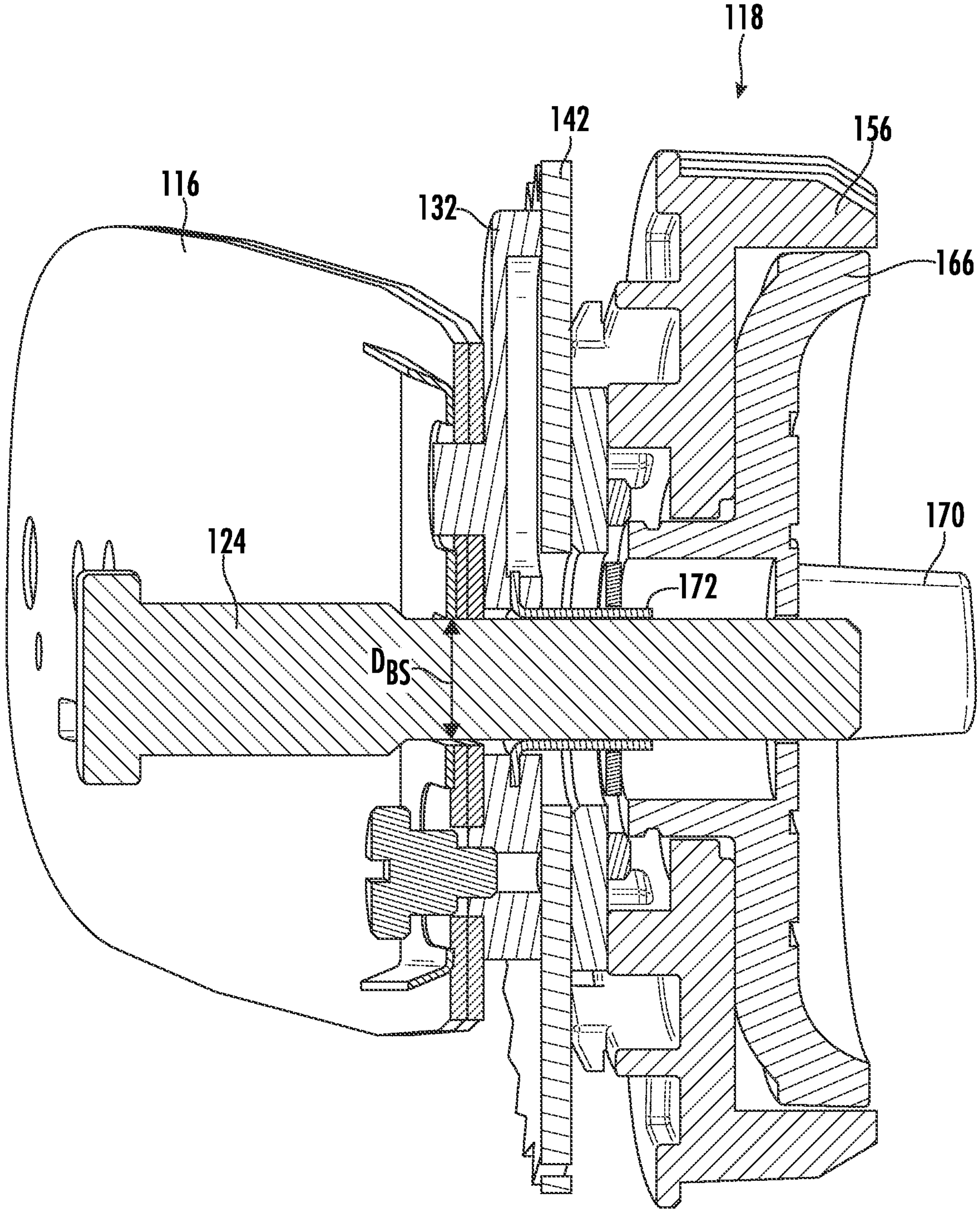
FIG. 3 is a cross-sectional view of a portion of the chainsaw as seen along Line A-A in FIG. 1 in accordance with an exemplary embodiment of the present disclosure.

FIG. 3 illustrates a rear cross-sectional view of a portion of the chainsaw 100 as seen along Line A-A in FIG. 1. As illustrated in FIG. 3, the yoke 132 can be disposed between the bar guide 116 and the ratchet gear 142. The ratchet gear can be disposed between the yoke 132 and the tensioning knob 156. As depicted, a sleeve 172 can support the tensioning system 118 relative to the bar stud 124. The sleeve 172 can include, for example, a flanged sleeve having a flange with a longitudinal sleeve extending therefrom. The flange can be engaged, for example, with the yoke 132 and extend outward, i.e., away from the bar guide 116. The bar stud 124 may rest on the sleeve 172.

Figure 4:
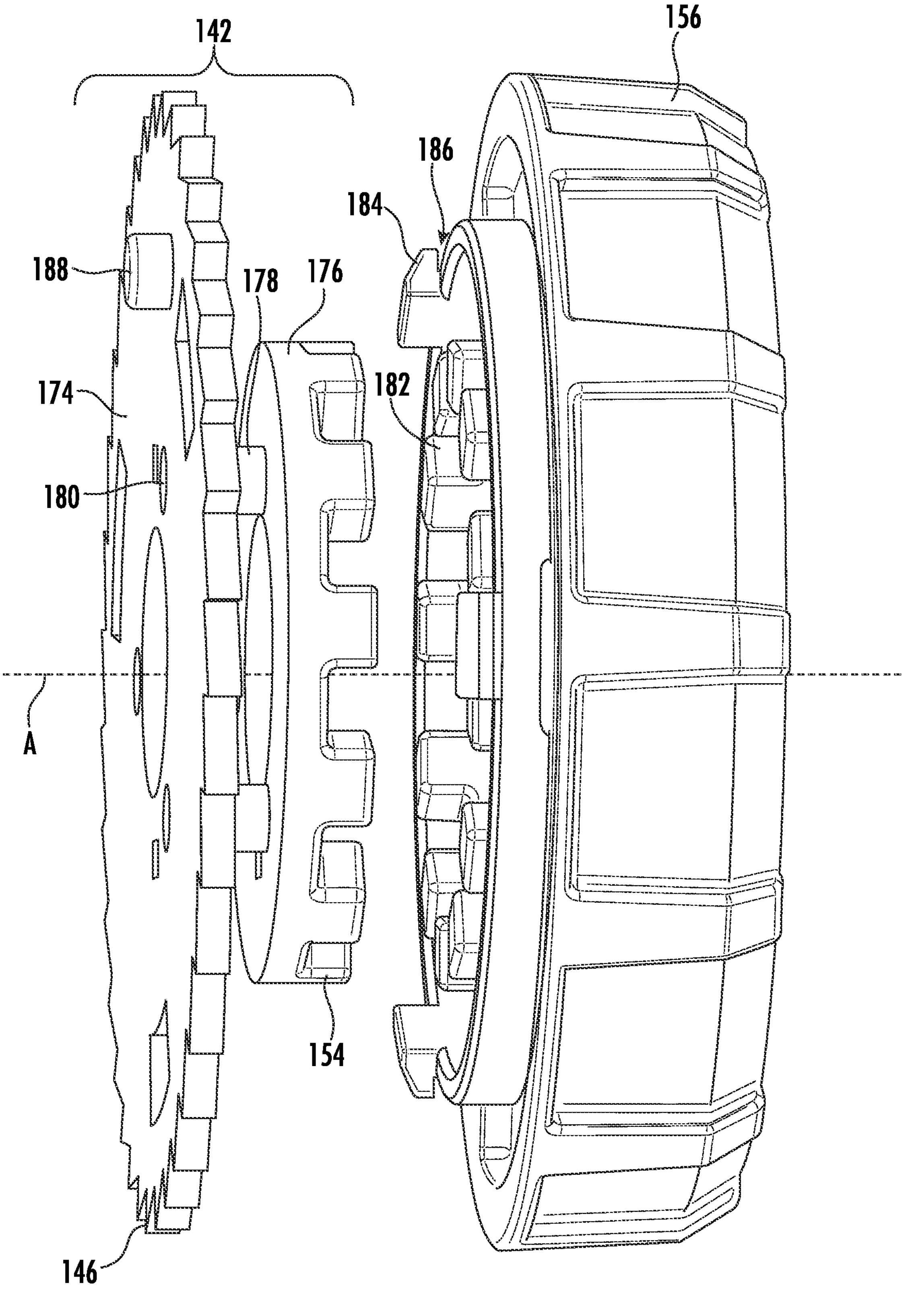
FIG. 4 is an exploded view of a portion of the tensioning system in accordance with an exemplary embodiment of the present disclosure.

FIG. 4 illustrates a partially exploded view of a portion of the tensioning system 118. In particular, FIG. 4 depicts the ratchet gear 142 and the tensioning knob 156 in accordance with an exemplary embodiment. As depicted, the ratchet gear 142 has a multi-piece construction including a first component 174 and a second component 176. The first component 174 may include the one-way motion feature 146 while the second component 176 includes the interface 154. The first and second components 174 and 176 may be coupled together such that the interface 154 and one-way motion feature 146 are rotationally keyed together. By way of non-limiting example, one of the first or second components 174 or 176 may include a projection 178 that is received in a corresponding cavity 180 of the other of the first or second components 174 or 176.

As previously described, the interface 154, e.g., teeth 158, of the ratchet gear 142 can interface with teeth 182 of the tensioning knob 156. In certain instances, the teeth 158 and 182 can sync such that there is no rotational play between the ratchet gear 142 and the tensioning knob 156. In other instances, a certain amount of rotational play may exist between the ratchet gear 142 and the tensioning knob 156. It should be understood that material selection for the ratchet gear 142 may differ from that of the tensioning knob 156. In this regard, and while not required, slight rotational play between the ratchet gear 142 and the tensioning knob 156 may allow for differential expansion and contraction related to different thermal coefficients of the two materials.

In certain instances, the tensioning knob 156 may include features 184 that extend inside the housing 104 of the chainsaw 100. The features 184 can include tabs that extend in a direction generally parallel with the axis of rotation of the tensioning knob 156. The features 184 can include surfaces 186 which interface with the housing 104 (or another component of the chainsaw 100) and ride thereagainst to maintain the tensioning knob 156 at a relatively fixed position with respect to the housing 104 (i.e., prevent the tensioning knob 156 from disconnecting from the chainsaw 100 when tension is released at the tightening cap 166.

Referring still to FIG. 4, the ratchet gear 142 can further include a post 188 extending away from the body 144. In an embodiment, the post 188 can project from the body 144 in a direction generally parallel with the axis of rotation A of the tensioning knob 156. The post 188 can have a generally cylindrical shape and be configured to interface with the groove 138 of the yoke 132. The post 188 can project a distance from the body 144 so as to extend into the groove 138. As the post 188 moves as a result of rotation of the ratchet gear 142, the post 188 can interface with the sidewall 140 of the groove 138 to bias the yoke 132.

Since the post 188 is spaced apart from the axis of rotation A by a radial distance, the post 188 experiences translation in two directions—one of these directions is parallel with the length LG of the groove 138 and the other direction is perpendicular therewith. Movement of the post 188 relative to the groove 138 in the direction of the length LG of the groove 138 can result in relative movement between the post 188 and groove 138 while movement of the post 188 relative to the groove 138 in the direction perpendicular to the groove 138 may result in force being exerted against the sidewall 140, thus biasing the yoke 132 in the direction parallel with the length Lys of the yoke slot 136. This perpendicular component of force can result in tensioning of the chain.

Figure 5:
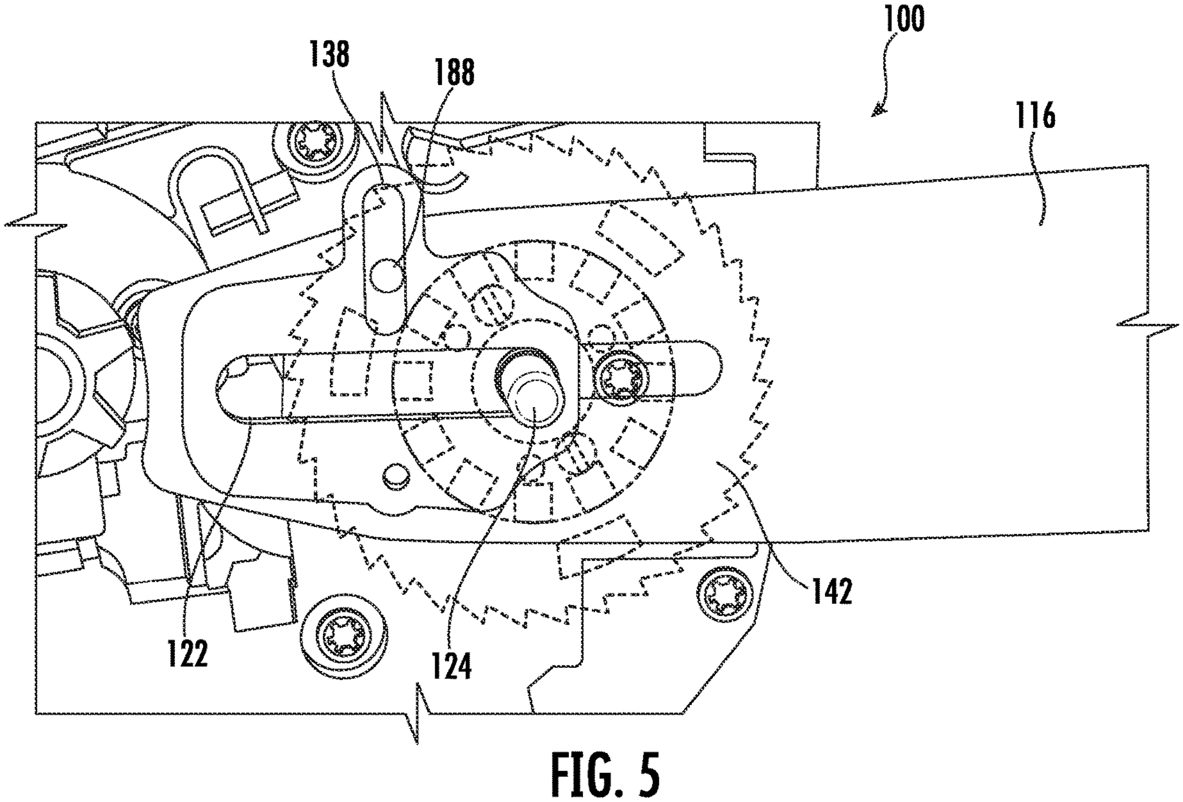
FIG. 5 is a partially transparent perspective view of a portion of the chainsaw as seen when a guide bar of the chainsaw is in a detensioned state in accordance with an exemplary embodiment of the present disclosure.
Figure 6:
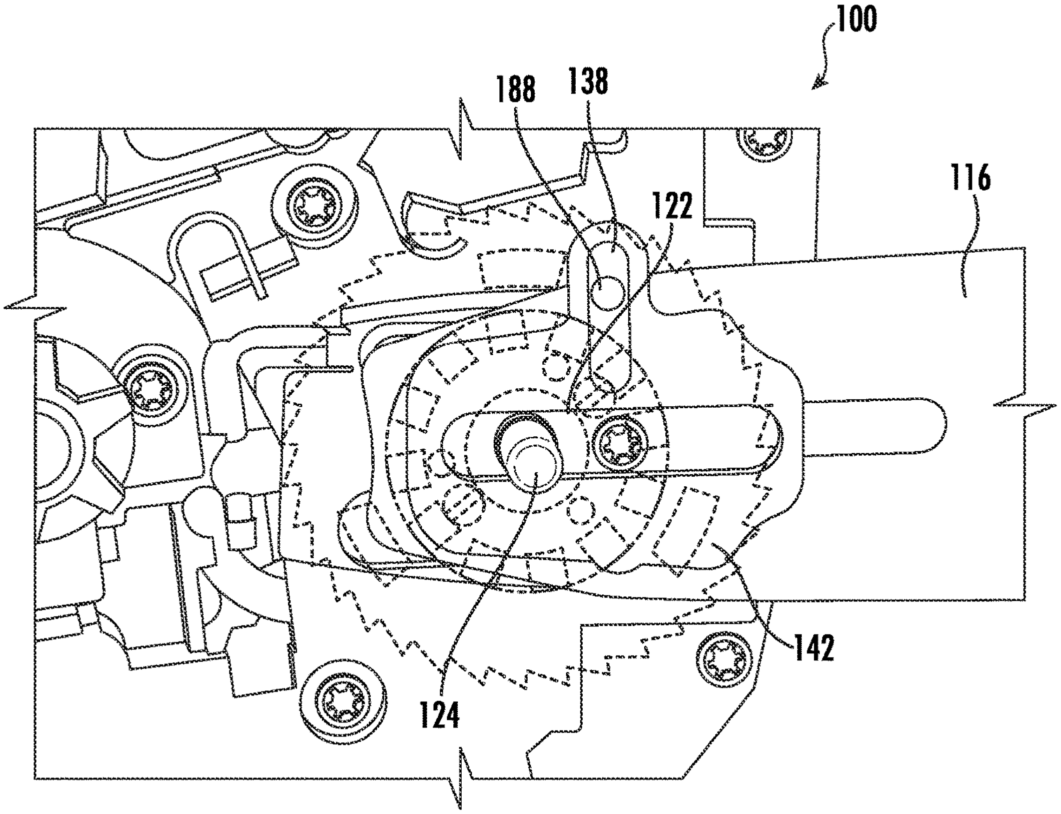
FIG. 6 is a partially transparent perspective view of a portion of the chainsaw as seen when the guide bar is in a tensioned state in accordance with an exemplary embodiment of the present disclosure.

FIGS. 5 and 6 illustrate partially cut away views of the chainsaw 100 with the ratchet gear 142 transparently depicted for ease of understanding. More particularly, FIG. 5 illustrates a view of the chainsaw 100 when the chain bar 116 is in a detensioned state while FIG. 6 illustrates a view of the chainsaw 100 when the chain bar 116 is in the tensioned, or a relatively greater tensioned, state. In the detensioned state depicted in FIG. 5, the bar stud 124 is disposed at a front end of the guide bar slot 122. Conversely, in the tensioned state (i.e., a state where the chain is tensioned to some amount greater than the detensioned, relaxed state) illustrated in FIG. 6, the bar stud 124 is spaced apart from the front end of the guide bar slot 122.

Displacement of the post 188 relative to the groove 138 during tensioning operations depends on several factors including, for example, the amount of existing slack in the chain prior to tensioning operations, the desired tension of the chain post-tensioning, and relative positions of the ratchet gear 142 and yoke 132 relative to one another prior to commencing the tensioning operation.

Figure 7:
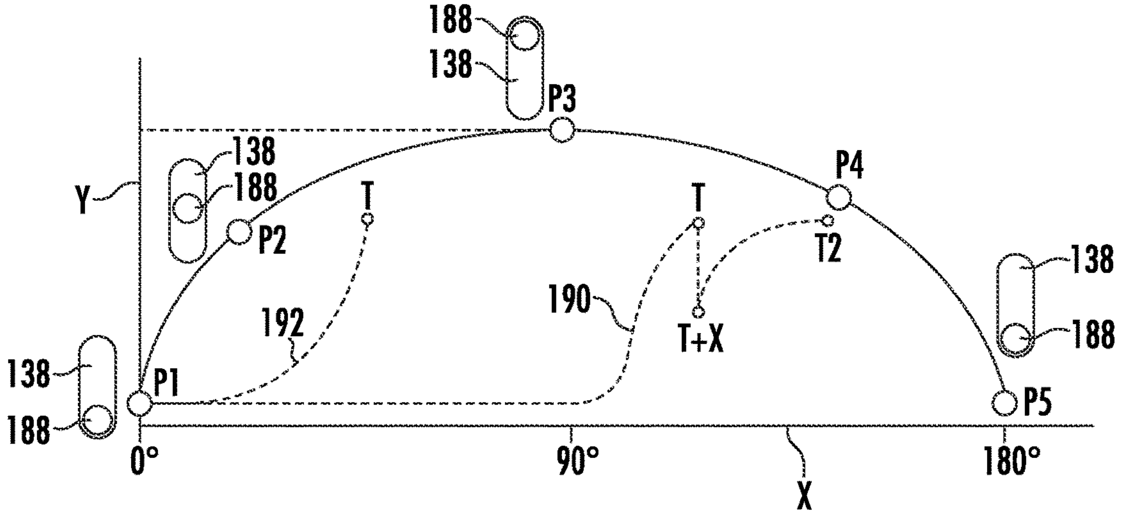
FIG. 7 is a plot illustrating displacement of a post of a ratchet gear of the tensioning system relative to a groove of a yoke of the tensioning system a product of rotational displacement of the ratchet gear in accordance with an exemplary embodiment of the present disclosure.

FIG. 7 depicts a plot illustrating displacement of the post 188 relative to the groove 138 along the Y axis as a product of rotational displacement of the ratchet gear 142 along the X axis. At the origin, the ratchet gear 142 is rotated to a minimum tension position. Moving along the X axis, the ratchet gear 142 is rotated to tension the guide bar 116.

At position P1 the post 188 is at a maximum detensioned state. In this regard, the post 188 is disposed adjacent to, or even at, a longitudinal end of the groove 138. It is noted that in certain instances the post 188 may not contact either or both longitudinal ends of the groove 138 when the tensioning system 118 is at extreme points of tension (i.e., at maximum or minimum tension). In other instances, the post 188 may contact one or both longitudinal ends of the groove 138 when the tensioning system 118 is at the extreme point of tension. Whether the post 188 contacts the longitudinal end(s) of the groove 138 may be controlled by the radial distance of the post 188 from the axis A (e.g., the further the post 188 is displaced from the axis A, the greater the distance of travel during rotation) in combination with the length LYS of the yoke slot 136.

As the ratchet gear 142 is rotated to tension the guide bar 116, the post 188 moves relative to the groove 138. At position P2, the post 188 is disposed approximately halfway along the length LYS of the yoke slot 136. At position P3, the post 188 is disposed at a longitudinal end of the yoke slot 136 opposite the end when the post 188 is at position P1. At position P4, the post 188 begins to travel away from the longitudinal end encountered at position P3 back towards the original longitudinal end at position P1. At position P5, the post 188 is fully returned to the original longitudinal end encountered at position P1. However, while the post 188 has travelled twice the length of the groove 138 at P5, the post 188 has an absolute displacement of approximately zero with respect to the groove 138. As a result, it should be understood that in accordance with the depicted displacement plot illustrated in FIG. 7, absolute displacement of the post 188 and groove 138 may not be indicative of tension in the guide bar 116. Moreover, it should be understood that in accordance with one or more embodiments the maximum rotational displacement of the tensioning system 118, as measured between extreme points of tension, is no greater than 180 degrees. In more particular embodiments, the maximum rotational displacement of the tensioning system 118 is no greater than 175 degrees, such as no greater than 170 degrees, such as no greater than 165 degrees, such as no greater than 160 degrees, such as no greater than 155 degrees, such as no greater than 150 degrees, such as no greater than 145 degrees, such as no greater than 140 degrees, such as no greater than 135 degrees, such as no greater than 130 degrees, such as no greater than 100 degrees, such as no greater than 60 degrees. It should be further understood that each tensioning operation may require less than the full tensioning displacement capable of being achieved by the tensioning system 118. As the chainsaw 100 is further used after a tensioning operation, it is likely that further chain slack will be introduced into the chain. Thus, the operator may readjust chain tension every use, or every few uses, in order to maintain chain tension within a desirable range.

Dashed line 190 depicts an exemplary tension profile of the chain as the ratchet gear 142 is rotated. As chain tension increases as a product of rotating the ratchet gear 142, the instantaneous value of the dashed line 190 goes up on the Y axis. Between positions P1 and P3, the chain tension does not increase. This is because in this exemplary embodiment, the chain began with a significant amount of slack which must be taken up by rotating the ratchet gear 142 between P1 and P3. Tension does not increase in the chain until the guide bar 116 reaches a minimum critical threshold at P3 where the chain tensioning effectively begins. Between positions P1 and P3, the guide bar 116 is moving to take up slack between the chain and the chain bar 116. At position P3, the chain begins to tighten and chain tension increases. The increase in chain tension may not be linear with respect to rotational displacement of the ratchet gear 142. That is, for example, displacement of the yoke 132 in the direction of tensioning (i.e., parallel with the length $L_{GBS}$ of the blade guide slot 122) may decrease per angular displacement of the ratchet gear 142 as the ratchet gear 142 approaches the 180 degrees displacement location. At time T, the desired chain tension is achieved and the chain tensioning operation terminates.

After some duration of use, the chain again slackens and further tensioning is required. This is shown by a drop in tension from point T to point T+X (representative of a duration of time X after time T). To increase tension, the tensioning system 118 is again utilized by rotating the ratchet gear 142. It is noted that because of the path taken by the post 188, extra rotational displacement of the ratchet gear 142 may be required to tension the chain back to the desired chain tension. It should be understood that this additional displacement requirement is caused by the path of travel of the post 188, i.e., more of the rotational displacement is directed to moving the post 188 along the groove 138 and less rotational displacement causes advancement of the yoke 132.

Dashed line 192 depicts another exemplary tension profile of the chain as the ratchet gear 142 is rotated. However, unlike the chain tension profile depicted by dashed line 192, chain tensioning represented by dashed line 192 begins almost immediately from a maximum detensioned position of the post 188. In this regard, tensioning occurs when the post 188 is closer to a longitudinal end of the groove 138. Additionally, tensioning is completed before the post 188 fully traverses the length of the groove 138.

Figure 8:
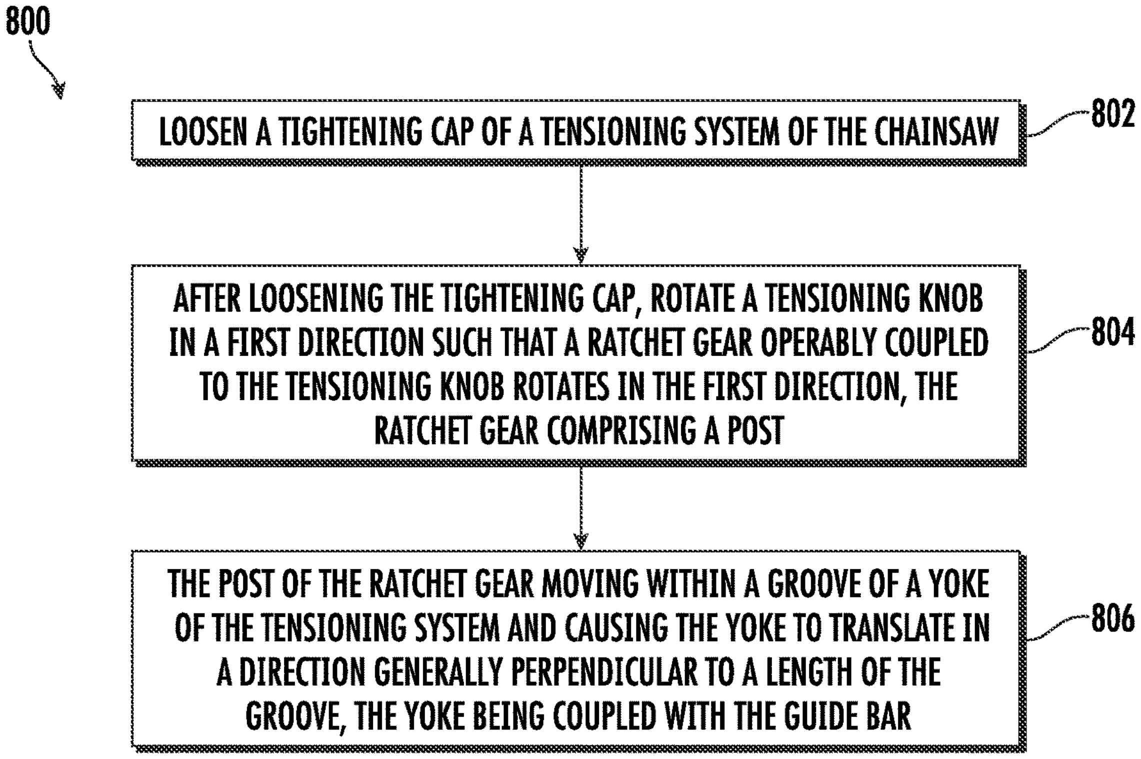
FIG. 8 is a flow chart illustrating a method of tensioning a chainsaw in accordance with an exemplary embodiment of the present disclosure.

FIG. 8 illustrates a method 800 of tensioning a guide bar of a chainsaw in accordance with a non-limiting embodiment. More specifically, the method 800 can allow an operator to tighten a chain around the guide bar from a tension below an acceptable threshold to a tension above the acceptable threshold. The method 800 can include a step 802 of loosening a tightening cap of a tensioning system of the chainsaw. In a particular embodiment, this step 802 can be performed by rotating the tightening cap. As described above, the tightening cap may include wings which permit a user to grasp the tightening cap. In certain instances, loosening the tightening cap can be performed in a manner such that the tightening cap remains attached to the chainsaw even after being loosened a sufficient amount to permit a tensioning operation. In other instances, the tightening cap can be loosened until the tightening cap is removed from the chainsaw.

The method 800 can further include a step 804 of rotating a tension knob in a first direction after loosening the tightening cap. The step 804 can include rotating the tensioning knob such that a ratchet gear operably coupled to the tensioning knob rotates in the first direction. This operable coupling can include, for example, use of mesh-synchro teeth (e.g., dogs) that extend from both of the tensioning knob and the ratchet gear. The ratchet gear can include a post extending therefrom. In an embodiment, the post can extend from a surface of the ratchet gear opposite the surface from which the dogs extend.

The method 800 can further include a step 806 where the post of the ratchet gear moves within a groove of a yoke of the tensioning system and causing the yoke to translate in a direction generally perpendicular with a length of the groove. The yoke can be coupled with the guide bar. Thus, as the yoke translates, the guide bar translates. When the tensioning knob is rotated in the first direction, as described above with respect to step 804, rotational movement can be imparted on the ratchet gear which can cause the yoke to translate.

Further aspects of the invention are provided by one or more of the following embodiments:

Embodiment 1. A chainsaw comprising: a body including a bar stud extending therefrom; a guide bar including a bar stud slot that receives the bar stud, wherein the bar stud slot has a length, and wherein the guide bar is configured to receive a chain; a yoke having a groove defining a length extending in a direction angularly offset from the length of the bar stud slot of the guide bar, wherein the yoke is coupled to the guide bar; a ratchet gear including a one-way motion feature and a post extending into the groove of the yoke, wherein rotating the ratchet gear in a first direction moves the guide bar to tighten the chain, and wherein rotating the ratchet gear in a second direction moves the guide bar to loosen the chain; and a pawl selectively engaged with the one-way motion feature of the ratchet gear, wherein the pawl permits rotation of the ratchet gear in the first direction, and wherein the pawl permits rotation of the ratchet gear in the second direction only when the pawl is selectively disengaged from the ratchet gear.

Embodiment 2. The chainsaw of any one or more of the embodiments, wherein the yoke is a discrete body separate from the guide bar, wherein the yoke comprises a body including a yoke slot that receives the bar stud, wherein the yoke slot is disposed adjacent to the guide bar slot, and wherein the yoke slot has a length oriented parallel with the length of the guide bar slot.

Embodiment 3. The chainsaw of any one or more of the embodiments, wherein the groove is perpendicular with the guide bar slot.

Embodiment 4. The chainsaw of any one or more of the embodiments, wherein the groove lies along a straight line.

Embodiment 5. The chainsaw of any one or more of the embodiments, wherein the one-way motion feature comprises a plurality of ridges, and wherein the pawl is spring biased toward the geared surface.

Embodiment 6. The chainsaw of any one or more of the embodiments, wherein the chainsaw further comprises: a tensioning knob coupled with the ratchet gear and configured to rotate the ratchet gear in response to user rotation of the tensioning knob; and a tightening cap configured to selectively tighten the guide bar at a desired location relative to the bar stud.

Embodiment 7. The chainsaw of any one or more of the embodiments, wherein the tensioning knob comprises teeth, wherein the ratchet gear comprises teeth, and wherein the teeth of the tensioning knob are configured to interface with the teeth of the ratchet gear to transmit rotational movement from the tensioning knob to the ratchet gear.

Embodiment 8. The chainsaw of any one or more of the embodiments, wherein the tensioning knob comprises a body defining a central recess, wherein the tightening cap is disposed in the central recess, and wherein the tightening cap is configured to engage with the bar stud.

Embodiment 9. A chainsaw tensioning system comprising: a yoke comprising a body defining a yoke slot and a groove angularly offset from the yoke slot; a ratchet gear comprising a one-way motion feature, a post extending into the groove of the yoke, and teeth, wherein the teeth are disposed on a first side of the ratchet gear, wherein the post is disposed on a second side of the ratchet gear, and wherein the one-way motion feature is disposed along a radial edge of the ratchet gear; a pawl selectively engaged with the one-way motion feature of the ratchet gear, the pawl configured to permit rotation of the ratchet gear in a first direction and selectively prevent rotation of the ratchet gear in a second direction; a tensioning knob comprising a grip portion and teeth configured to transmit rotational movement to the teeth of the ratchet gear; and a tightening cap configured to selectively tighten the chainsaw tensioning system to a bar stud of a chainsaw.

Embodiment 10. The chainsaw tensioning system of any one or more of the embodiments, wherein the yoke is configured to be coupled to a guide bar of the chainsaw such that the bar stud extends through a guide bar slot of the guide bar and the yoke slot, and wherein the yoke slot and guide bar slot are parallel with one another.

Embodiment 11. The chainsaw tensioning system of any one or more of the embodiments, wherein the groove lies along a straight line, and wherein the groove is oriented perpendicular to the yoke slot.

Embodiment 12. A method of tensioning a guide bar of a chainsaw, the method comprising: loosening a tightening cap of a tensioning system of the chainsaw; after loosening the tightening cap, rotating a tensioning knob in a first direction such that a ratchet gear operably coupled to the tensioning knob rotates in the first direction, the ratchet gear comprising a post; and the post of the ratchet gear moving within a groove of a yoke of the tensioning system and causing the yoke to translate in a direction generally perpendicular to a length of the groove, the yoke being coupled with the guide bar.

Embodiment 13. The method of any one or more of the embodiments, wherein the ratchet gear comprises a one-way motion feature and the tensioning system further comprises a pawl interfaced with the one-way motion feature such that causing the yoke to translate in the first direction advances the pawl from a first stop location along the one-way motion feature to a second stop location along the one-way motion feature.

Embodiment 14. The method of any one or more of the embodiments, wherein loosening the tightening cap comprises rotating the tightening cap about an axis, and wherein rotating the tensioning knob is performed along the same axis.

Embodiment 15. The method of any one or more of the embodiments, further comprising tightening the tensioning cap after the yoke translates a sufficient distance to tighten a chain coupled to the guide bar.

Embodiment 16. The method of any one or more of the embodiments, wherein loosening tension of the guide bar after tightening the tensioning cap comprises: loosening the tensioning cap; and releasing a pawl operatively engaged with a one-way motion feature of the ratchet gear.

Embodiment 17. The method of any one or more of the embodiments, wherein rotating the tensioning knob comprises rotating teeth of the tensioning knob, the teeth being in communication with teeth of the ratchet gear, and wherein the teeth are on an opposite side of the ratchet gear as compared to the post.

Embodiment 18. The method of any one or more of the embodiments, wherein rotating the tensioning knob to tension the guide bar from a fully detensioned state and a fully tensioned state comprises rotating the tensioning knob no greater than 180 degrees.

Embodiment 19. The method of any one or more of the embodiments, wherein loosening the tightening cap is performed by unthreading the tightening cap relative to a bar stud of the chainsaw, wherein the guide bar comprises a guide bar slot in which the bar stud extends through, and wherein translating the yoke in response to moving the post of the ratchet gear causes the bar stud to move within the guide bar slot.

Embodiment 20. The method of any one or more of the embodiments, wherein the groove lies along a straight line, and wherein the groove is oriented perpendicular to the guide bar slot.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A chainsaw tensioning system comprising:

a tensioning knob rotatable to move a guide bar relative to a drive gear of a chainsaw to tension a chain of the chainsaw, wherein a maximum displacement of the tensioning knob is measured between extreme points of tension and is no greater than 180 degrees; and a one-way motion structure configured to permit rotation of the tensioning knob in a first direction and selectively restrict rotation of the tensioning knob in a second direction opposite the first direction, wherein the tensioning knob and the one-way motion structure are rotatable about a same rotational axis.

2. The chainsaw tensioning system of claim 1, wherein the maximum displacement of the tensioning knob is greater than 90 degrees.

3. The chainsaw tensioning system of claim 1, wherein a slot is coupled to the guide bar, wherein a post is coupled to the tensioning knob, and wherein the guide bar moving relative to the drive gear in a first direction different than a second direction of the post moving relative to the slot during rotation of the tensioning knob.

4. The chainsaw tensioning system of claim 3, wherein the first and second directions are different from one another during an entire rotational displacement of the tensioning knob.

5. The chainsaw tensioning system of claim 3, wherein the first direction is angularly offset from the second direction by at least 30 degrees.

6. The chainsaw tensioning system of claim 3, wherein the first direction is generally perpendicular to the second direction.

7. The chainsaw tensioning system of claim 1, wherein the one-way motion structure comprises a plurality of ridges disposed at a radial edge of a ratchet gear, and wherein the ratchet gear defines a central axis aligned with the rotational axis.

8. A chainsaw comprising:

a guide bar including a chain;

a tensioning knob rotatable to move the guide bar relative to a drive gear of the chainsaw in a first direction to tension the chain; and an interface between the guide bar and the tensioning knob, the interface comprising:

a post coupled to the tensioning knob; and a slot coupled to and movable with the guide bar, wherein the post moves relative to the slot in a second direction different than the first direction, and wherein the second direction is a linear direction.

9. The chainsaw of claim 8, wherein the first and second directions are different from one another during an entire rotational displacement of the tensioning knob.

10. The chainsaw of claim 8, wherein the slot is disposed in a yoke coupled to the guide bar.

11. The chainsaw of claim 8, wherein the first direction is angularly offset from the second direction by at least 30 degrees.

12. The chainsaw of claim 8, wherein the first direction is generally perpendicular to the second direction.

13. The chainsaw of claim 8, wherein the tensioning knob is coupled to a one-way motion structure configured to permit rotation of the tensioning knob in a first direction and selectively restrict rotation of the tensioning knob in a second direction opposite the first direction.

14. The chainsaw of claim 8, wherein the tensioning knob is selectively prevented from rotating by a tightening cap disposed in a central recess of the tensioning knob.

15. A chainsaw tensioning system comprising:

a yoke configured to be coupled to a guide bar of a chainsaw including a chain;

a tensioning knob rotatable to move the yoke relative to a drive gear of the chainsaw in a first direction to tension the chain; and an interface between the guide bar and the tensioning knob, the interface comprising:

a post coupled to the tensioning knob; and a slot coupled to the guide bar, wherein the post moves relative to the slot in a second direction different than the first direction, and wherein the second direction is a linear direction.

16. The chainsaw of claim 15, wherein the first and second directions are different from one another during an entire rotational displacement of the tensioning knob.

17. The chainsaw of claim 15, wherein the slot is disposed in a yoke coupled to the guide bar.

18. The chainsaw of claim 15, wherein the first direction is angularly offset from the second direction by at least 30 degrees.

19. The chainsaw of claim 15, wherein the first direction is generally perpendicular to the second direction.

20. The chainsaw of claim 15, wherein the tensioning knob is coupled to a one-way motion structure configured to permit rotation of the tensioning knob in a first direction and selectively restrict rotation of the tensioning knob in a second direction opposite the first direction.

* * * * *